United States Patent
Pattichis et al.

(10) Patent No.: US 10,943,322 B2
(45) Date of Patent: Mar. 9, 2021

(54) SYSTEM AND METHODS FOR THE COMPUTATION OF THE FORWARD AND INVERSE DISCRETE PERIODIC RADON TRANSFORM ON GPUS AND CPUS

(71) Applicant: STC.UNM, Albuquerque, NM (US)

(72) Inventors: Marios Stephanou Pattichis, Albuquerque, NM (US); Cesar Carranza, Miami Beach, FL (US); Daniel Llamocca Obregon, Clawson, MI (US)

(*) Notice: Subject to any disclaimer, the term of this patent is extended or adjusted under 35 U.S.C. 154(b) by 0 days.

(21) Appl. No.: 15/780,076

(22) PCT Filed: Dec. 16, 2016

(86) PCT No.: PCT/US2016/067110
§ 371 (c)(1),
(2) Date: May 30, 2018

(87) PCT Pub. No.: WO2017/106606
PCT Pub. Date: Jun. 22, 2017

(65) Prior Publication Data
US 2018/0357745 A1 Dec. 13, 2018

Related U.S. Application Data

(60) Provisional application No. 62/268,492, filed on Dec. 16, 2015.

(51) Int. Cl.
*G06T 1/20* (2006.01)
*G06T 11/00* (2006.01)
(Continued)

(52) U.S. Cl.
CPC .............. *G06T 1/20* (2013.01); *G06F 9/3001* (2013.01); *G06F 9/5066* (2013.01); *G06T 11/006* (2013.01); *G01V 2210/46* (2013.01)

(58) Field of Classification Search
CPC ..... G01V 2210/46; G06T 1/20; G06T 11/006; G06F 9/3001; G06F 9/5066
(Continued)

(56) References Cited

U.S. PATENT DOCUMENTS 7,792,895 B1* 9/2010 Juffa ........................ G06F 17/16
708/607
2010/0088356 A1* 4/2010 Lloyd .................. G06F 17/142
708/404
(Continued)

FOREIGN PATENT DOCUMENTS

WO 2015095064 6/2015

OTHER PUBLICATIONS

Hsung et al., The Discrete Periodic Radon Transform, IEEE Transactions on Signal Processing, vol. 44, No. 10, Oct. 1996, pp. 2651-2657.*
(Continued)

*Primary Examiner* — Jacinta M Crawford
(74) *Attorney, Agent, or Firm* — Valauskas Corder LLC

(57) ABSTRACT

Fast and a scalable algorithms and methods adaptable to available resources for computing (1) the DPRT on multi-core CPUs by distributing the computation of the DPRT primary directions among the different cores, and (2) the DPRT on GPUs using parallel, distributed, and synchronized ray computations among the GPU cores with "ray" referring to one of the sums required for computing the DPRT or its inverse along a prime direction.

14 Claims, 9 Drawing Sheets

| | | | | Running time (ms) (speedup) | | | | |
|---|---|---|---|---|---|---|---|---|
| Size | FastDirDPRT Single-Core CPU | FastDirDPRT Multi-Core CPU | FastRayDPRT GPU | FastScaleDPRT FPGA impl. | FastDirInvDPRT Single-Core CPU | FastDirInvDPRT Multi-Core CPU | FastRayInvDPRT GPU | FastScaleInvDPR FPGA impl. |
| 127 | 17.37 (1) | 2.30(7.54) | 0.03 (526) | 0.09 (200) | 17.46 (1) | 2.25 (7.75) | 0.03 (529) | 0.08 (211) |
| 157 | 37.25 (1) | 3.66(10.19) | 0.06 (677) | 0.13 (284) | 35.50 (1) | 3.43 (10.35) | 0.06(617) | 0.13 (282) |
| 251 | 138.25 (1) | 12.10(11.42) | 0.18 (750) | 0.33 (422) | 139.25 (1) | 12.15 (11.47) | 0.20 (700) | 0.32 (436) |
| 313 | 273.50 (1) | 27.00(10.13) | 0.35 (788) | 0.51 (541) | 270.25 (1) | 25.50 (10.60) | 0.36 (743) | 0.49(546) |
| 479 | 963.50 (1) | 77.00(12.51) | 1.36 (707) | 1.17 (823) | 971.50 (1) | 82.75 (11.74) | 1.25 (774) | 1.15 (841) |
| 701 | 3031.50 (1) | 236.25 (12.83) | 4.20 (722) | 2.49 (1216) | 3001.00 (1) | 239.50 (12.53) | 3.89 (771) | 2.47 (1216) |
| 827 | 5166.50 (1) | 422.50(12.23) | 6.33 (816) | 3.46 (1493) | 5095.50 (1) | 420.75 (12.11) | 5.92 (861) | 3.43 (1485) |
| 102 | 9811.00 (1) | 1021.25(9.61) | 11.50 (853) | 5.26 (1864) | 9921.00 (1) | 1020.75 (9.72) | 11.36 (873) | 5.23 (1898) |

(51) Int. Cl.
G06F 9/50 (2006.01)
G06F 9/30 (2018.01)
(58) Field of Classification Search
USPC .......................................... 345/501
See application file for complete search history.

(56) References Cited

U.S. PATENT DOCUMENTS

| | | |
|---|---|---|
| 2014/0201755 A1 | 7/2014 | Munshi et al. |
| 2015/0178879 A1* | 6/2015 | Palmer .................... G06F 9/505 |
| | | 345/506 |
| 2015/0325033 A1* | 11/2015 | Bakalash ............ G06F 12/0875 |
| | | 345/503 |

OTHER PUBLICATIONS

Imants Svalbe. Sampling Properties of the Discrete Radon Transform. Discrete Applied Mathematics vol. 139. Apr. 2004. pp. 265-281 (Year: 2004).*

* cited by examiner

▷ *FastDirDPRT*: Main algorithm for parallel computation
▷ of the DPRT using a multi-core CPU with $M_L$ logical
▷ cores. *Assume $N \gg M_L$*.
▷ Inputs:
▷     $N$: input image size.
▷     img : input image of size $N \times N$.
▷     img uses column-major storage.
▷ Output:
▷     R : DPRT of img.
1: Partition the set of $N + 1$ prime directions
    into $M_L$ sets: $Thr_1, Thr_2, \ldots, ThrM_L$ of consecutive
    prime directions.
2: Launch $M_L$ threads of DPRT_CPU_Core() by
    assigning each partitioned set $Dirns_j$ to each logical
    core.
3: Wait for threads to finish.

4: procedure DPRT_CPU_Core (R, img, dirIni, dirEnd)
▷ Computes $R[m][d]$ along prime directions in $Dirns_j$.
▷ Inputs:
▷     img: Input image.
▷     dirIni: Starting DPRT direction (starting $m$).
▷     dirEnd: Ending DPRT direction (ending $m$).
▷     Note: $Dirns_j = \{dirIni, \ldots, dirEnd\}$.
▷ Output:
▷     $R[m][d]$ for $m = dirIni, \ldots, dirEnd$
▷         and $0 \le d \le N - 1$.

5:     if (dirEnd == $N$) then
6:         for $d = 0$ to $N - 1$ do
7:             sum = img$[d][0]$
8:             for $j = 1$ to $N - 1$ do
9:                 sum = sum + img$[d][j]$
10:             end for
11:             $R[N][d]$ = sum
12:         end for
13:         dirEnd = $N - 1$ ▷ Remove vertical direction
14:     end if

15:     for m = dirIni to dirEnd do
16:         for $d = 0$ to $N - 1$ do
17:             sum = img$[0][d]$
18:             for $i = 1$ to $N - 1$ do
19:                 sum = sum + img$[i][\langle d + mi \rangle_N]$
20:             end for
21:             $R[m][d]$ = sum
22:         end for
23:     end for
24: end procedure

FIG. 2

▷ *FastInvDirDPRT:* Main algorithm for the parallel
▷ computation of the inverse DPRT using a
▷ multi-core CPU with $M_L$ logical cores.
▷ Assume $N >> M_L$.
▷ Inputs:
▷    $N$ : input DPRT size parameter.
▷    $R$ : DPRT of size $(N + 1) \times N$.
▷       R uses column-major storage.
▷ Output:
    img: reconstructed image.

1: Partition the set of $N$ prime directions
     into $M_L$ sets of consecutive prime directions.
2: Compute $S = \sum_{d=0}^{N-1} R[0][d]$.

3: Launch $M_L$ threads of iDPRT_DPRT_Core()
     by assigning each partitioned set to each logical core
     to compute $f[i][j]$.
4: Wait for threads to finish.
5: procedure iDPRT_DPRT_Core (dirIni, dirEnd)
     Computes $f[i][j]$ for specified $i$, all $j$.
▷   Inputs:
▷      dirIni: Starting direction (starting $i$).
▷      dirEnd: Ending direction (ending $i$).
▷      Note: Dirns$_i$ = {dirIni, . . . , dirEnd}.
▷   Output:
▷      img $[i][j]$ for $i$ = dirIni, . . . , dirEnd
▷            and $0 \le j \le N - 1$.

6:   for $i$ = dirIni to dirEnd do
7:     for $j$ = 0 to $N - 1$ do
8:       sum = $R[0][j]$
9:       for m = 1 to $N - 1$ do
10:         sum = sum + $R[m][(j - m \cdot i)_N]$
11:       end for
12:       $f[i][j]$ = (sum $- S + R[N][i])/N$
13:     end for
14:   end for
15: end procedure

▷ *FastRayDPRT:* Main algorithm for parallel computation
▷ of the DPRT using a GPU with $M_p$ multiprocessors.
▷ Assume $M_p$ is $O(N)$.
▷ Inputs:
▷    $N$: input image size.
▷    img : input image of size $N \times N$.
▷       img uses row-major storage.
▷ Output:
      R : DPRT of img.

1: *Partition* the set of $N + 1$ prime directions into $M_p$ sets: $Thr_1, Thr_2, \ldots, Thr_{M_p}$ of consecutive prime directions.
2: *Launch* DPRT_GPU_Kernel() to compute ray threads on each multiprocessor using directions given by $m \in Thr_j$ and initial pixel offsets given by $d = 0, \ldots, N - 1$.
3: *Wait* for threads to finish.

FIG. 5

▷ *FastRayInvDPRT:* Main algorithm for parallel
▷ computation of the inverse DPRT using a GPU with
▷ $M_p$ multiprocessors. Assume $M_p$ is $O(N)$.
▷ Inputs:
▷   $N$: input DPRT size parameter.
▷   R: DPRT of size $(N + 1) \times N$.
▷     R uses column-major storage.
▷ Output:
▷   img: reconstructed image.

1: *Partition* the set of $N$ prime directions into $M_p$ sets of consecutive prime directions.
2: *Compute* $S = \sum_{d=0}^{N-1} R[0][d]$.
3: *Launch* ray threads using Inv_DPRT_GPU_Kernel() with parameters $(i, j)$ for $i \in Thr_k$ for each multiprocessor and initial pixel offset given by $j = 0, \ldots, N - 1$ to compute $f[i][j]$.
4: *Wait* for threads to finish.

FIG. 6

1: procedure DPRT_GPU_Kernel (radon, img, N, m, d)
   ▷ Compute $R(m, d)$ from $f(i, j)$ along a single ray.
   ▷ Computation is done on a single GPU core.
   ▷ Inputs:
   ▷   N:     image size.
   ▷   img:   1D array with for row-major storage of $f(i, j)$.
   ▷   ( m, d ): specifies m-th direction from d-th pixel.
   ▷ Outputs:
   ▷   radon: stores $R(m, d)$ in row-major format.

▷ Initiate regular row-level pixel access for all threads
2:     if ($m == N$) then
3:        ▷ Add elements within each row:
4:        offs = 0        ▷ Stay within current row.
5:        incr = 1        ▷ Next element in current row.
6:        init = $d \cdot N$   ▷ Select row to sum.
7:     else
8:        ▷ Add elements by moving from row to row:
9:        offs = $d$      ▷ Offset for next row.
10:       incr = $N$      ▷ Next element in next row.
11:       init = 0        ▷ Start from the first row.
12:    end if

▷ Synchronized memory access for row access:
13:    Synchronize threads.

▷ Compute the index of the final result in k.
14:    $k = d + m \cdot N$

▷ Move through all of the rows/column by:
   ▷   - adding m offset to get to the next element.
   ▷   - adding row/column offset.
15:    sum = 0
16:    for $i = 0$ to $N - 1$ do
17:       sum = sum + img [init + offs]
18:       offs = $\langle \text{offs} + m \rangle_N$   ▷ Element position.
19:       init = init + incr    ▷ Next row/column.
20:    end for
21:    radon[ $k$ ] = sum
22: end procedure

FIG. 7

1: procedure Inv_DPRT_GPU_Kernel ( img, radon, $N$, $S$, $i, j$ )
    ▷ Compute $f(i, j)$ from $R(m, d)$ on a single GPU core.
    ▷ Inputs:
    ▷    $N, S$:   image size and total sum of all values.
    ▷    $(i, j)$:   specifies the image index to reconstruct.
    ▷    radon:   stores $R(m, d)$ to be inverted.
    ▷ Output:
    ▷    img:   used to store $f(i, j)$.

▷ Compute the index of the final result in $k$.
2:    $k = j + i \cdot N$

▷ Row-by-row access for each ray.
    ▷ We have *synchronized* thread execution for all threads.
    ▷ Synchronization achieved because all directions are
    ▷ executing the same code.
3:    sum = 0
4:    offs = $j$   ▷ Starting offset for thread.
5:    init = 0   ▷ Start from the first row.
6:    for $m = 0$ to $N - 1$ do
7:        sum = sum + radon[init + offs]
8:        offs = (offs $- i + N)_N$   ▷ Next element offset.
9:        init = init + $N$   ▷ Next row.
10:   end for
11:   img[$k$] = (sum $- S +$ radon[ $N \cdot N + i$ ])/$N$
12: end procedure

FIG. 8

|  | FastDirDPRT Single-Core CPU | FastDirDPRT Multi-Core CPU | FastRayDPRT GPU | FastScaleDPRT FPGA impl. | FastDirInvDPRT Single-Core CPU | FastDirInvDPRT Multi-Core CPU | FastRayInvDPRT GPU | FastScaleInvDPR FPGA impl. |
|---|---|---|---|---|---|---|---|---|
| Size | | | | | | | | |
| 127 | 17.37 (1) | 2.30 (7.54) | 0.03 (526) | 0.09 (200) | 17.46 (1) | 2.25 (7.75) | 0.03 (529) | 0.08 (211) |
| 157 | 37.25 (1) | 3.66 (10.19) | 0.06 (677) | 0.13 (284) | 35.50 (1) | 3.43 (10.35) | 0.06 (617) | 0.13 (282) |
| 251 | 138.25 (1) | 12.10 (11.42) | 0.18 (750) | 0.33 (422) | 139.25 (1) | 12.15 (11.47) | 0.20 (700) | 0.32 (436) |
| 313 | 273.50 (1) | 27.00 (10.13) | 0.35 (788) | 0.51 (541) | 270.25 (1) | 25.50 (10.60) | 0.36 (743) | 0.49 (546) |
| 479 | 963.50 (1) | 77.00 (12.51) | 1.36 (707) | 1.17 (823) | 971.50 (1) | 82.75 (11.74) | 1.25 (774) | 1.15 (841) |
| 701 | 3031.50 (1) | 236.25 (12.83) | 4.20 (722) | 2.49 (1216) | 3001.00 (1) | 239.50 (12.53) | 3.89 (771) | 2.47 (1216) |
| 827 | 5166.50 (1) | 422.50 (12.23) | 6.33 (816) | 3.46 (1493) | 5095.50 (1) | 420.75 (12.11) | 5.92 (861) | 3.43 (1485) |
| 1021 | 9811.00 (1) | 1021.25 (9.61) | 11.50 (853) | 5.26 (1864) | 9921.00 (1) | 1020.75 (9.72) | 11.36 (873) | 5.23 (1898) |

Running time (ms) (speedup)

FIG. 10

| Method | Time (ms) | Image Size |
|---|---|---|
| FastDirDPRT on Single-Core CPU | 30.5 | 151 x 151 |
| FastDirDPRT on Multi-Core CPU | 30.3 | 353 x 353 |
| FastRayDPRT on CPU | 32.1 | 1471 x 1471 |

FIG. 11

SYSTEM AND METHODS FOR THE COMPUTATION OF THE FORWARD AND INVERSE DISCRETE PERIODIC RADON TRANSFORM ON GPUS AND CPUS

CROSS-REFERENCE TO RELATED APPLICATIONS

This application claims the benefit of U.S. Provisional Application No. 62/268,492 filed on Dec. 16, 2015, incorporated by reference in its entirety.

STATEMENT FEDERALLY SPONSORED RESEARCH OR DEVELOPMENT

This invention was made with government support under CNS-1422031 awarded by National Science Foundation. The government has certain rights in the invention.

FIELD OF THE INVENTION

The invention relates generally to image processing. More specifically, the invention relates to the fast computation of the Discrete Periodic Radon Transform (DPRT) and its inverse on multi-core CPUs and GPUs.

The following patents and patent applications are incorporated by reference: U.S. patent application Ser. No. 14/069,822 filed Nov. 1, 2013, now U.S. Pat. No. 9,111,059; U.S. patent application Ser. No. 14/791,627 filed Jul. 6, 2015; and International Patent Application PCT/US14/70371 filed Dec. 15, 2014, now U.S. patent application Ser. No. 15/103,977.

BACKGROUND OF THE INVENTION

Graphics Processing Units (GPUs) have been established as important alternatives to general purpose microprocessors for performing large/complex computations. Real-time image processing applications can significantly benefit from the hardware resources available on GPUs. Similarly, real-time image processing applications can also benefit from the emergence of multi-core CPUs. A CPU consists of a few cores optimized for sequential serial processing while a GPU consists of thousands of smaller, more efficient cores designed for handling multiple tasks simultaneously. For example, GPUs are designed to perform functions such as texture mapping, image rotation, translation, shading, etc.

The Discrete Radon Transform (DRT) is an essential component of a wide range of applications in image processing. Applications of the DRT include the classic application of reconstructing objects from projections such as in computed tomography, radar imaging and magnetic resonance imaging. More recently, the DRT has also been applied in image denoising, image restoration, texture analysis, line detection in images, compressive sensing and encryption.

A popular method for computing the DRT, or its inverse, involves the use of the Fast Fourier Transform (FFT), with the inherent approximation/rounding errors and increased hardware complexity due to the need for floating point arithmetic implementations. Floating point units require significantly larger amounts of hardware resources than fixed point implementations.

An alternative implementation of the DRT is through the use of the DPRT. The DPRT has been extensively used in applications that involve image reconstructions from projections. Beyond classic applications, the DPRT can also be used to compute fast convolutions that avoid the use of floating-point arithmetic. Unfortunately, the use of the DPRT has been limited by the need to compute a large number of additions and the need for a large number of memory accesses.

Similar to the continuous-space Radon Transform, the DPRT satisfies discrete and periodic versions of the Fourier slice theorem and the convolution property. Thus, the DPRT can lead to efficient, fixed-point arithmetic methods for computing circular and linear convolutions. The discrete version of the Fourier slice theorem provides a method for computing 2-D Discrete Fourier Transforms based on the DPRT and a minimal number of 1-D FFTs.

There is a demand for DPRT algorithms that are both fast and scalable. More specifically, there is a demand for efficient algorithms for computing the DPRT and inverse DPRT on widely available hardware platforms, for example, a CPU (central processing unit) and GPU (graphics processing unit). The invention satisfies this demand.

SUMMARY OF THE INVENTION

The invention provides scalable and fast frameworks for computing the forward and inverse DPRT using GPUs and multi-core CPUs. Scalability on the GPUs is a function of the number of multi-processors (MIMD) and their associated cores (SIMD). For the CPUs, scalability is a function of the number of cores (MIMD).

As further detailed and described in International Patent Application PCT/US14/70371 filed Dec. 15, 2014, now U.S. patent application Ser. No. 15/103,977, a set of parallel algorithms and associated scalable architectures compute the forward and inverse DPRT of an N×N image that allows effective implementations based on different constraints on running time and resources. In terms of resources and running time, the scalable framework provides optimal configurations in the multi-objective sense. In terms of performance, the fastest architecture computes the DPRT in linear time (with respect to N). The architecture and methods are directed to forward and inverse DPRT and in particular, a scalable and fast Discrete Periodic Radon Transform ("SFDPRT"), an inverse scalable and fast Discrete Periodic Radon Transform ("iSFDPRT"), fast Discrete Periodic Radon Transform ("FDPRT") and inverse fast Discrete Periodic Radon Transform (IFDPRT).

One advantage of the invention is directed to parallel implementations of the DPRT and iDPRT on multi-core CPUs. The invention provides FastDirDPRT directed to the parallel computation of the DPRT and FastDirInvDPRT directed to the parallel computation of the inverse DPRT, both limited number of cores available in a multi-core CPU. The parallel implementations distribute processing of the prime directions among all the logical cores available. More particularly, the set of primary directions are partitioned into sequential subsets with each subset on each available core computed independently. For maximum speed-up, the set of prime directions is partitioned among the logical cores. Compared to a serial (single-core) or sequential implementations, the invention achieves a tenfold speedup with 16 logical cores (8 hardware cores).

Another advantage is directed to parallel and memory efficient DPRT and iDPRT implementations on GPUs. For GPU implementations, there is a strong need to develop methods that support parallelism on a large number of cores with significantly reduced memory requirements. To achieve a significantly higher level of parallelism, the invention provides FastRayDPRT and FastRayInvDPRT that compute each DPRT element R[m][d] and reconstruct each image pixel img[i][j] independently. Implementing in parallel the computation of the DPRT and iDPRT on a GPU comprises the steps of distributing the computation of prime directions among the multiprocessors (MP) and further distributing to available cores within each MP one or more rays associated with each prime direction. The term "ray" refers to one of the sums required for computing the DPRT or its inverse along a prime direction. Furthermore, parallel threads can be synchronized so that each thread always reads the same row of pixels at the same time. Row-major ordering is enforced for read and write operations. By synchronizing the threads within each direction, memory requirements are significantly reduced to a single row of pixels. In addition, one or more optimizations may be applied such as pixel width, optimal concurrency of warps, fast address calculation and modulo operation masking. Compared to a serial (single-core) or sequential implementations, the invention achieves speedups in the range of 600 to 870 which approximates the estimated ideal speedup of 860 (based on the number of cores and frequency of operation).

In particular, the invention provides a method for computing a forward Discrete Periodic Radon Transform (DPRT) using a multi-core CPU. An input image is received and a set of prime directions partitioned into sets of threads with each thread comprising consecutive prime directions. Each partitioned set of threads is assigned to different logical cores of the multi-core CPU. Each logical core executes the assigned partitioned set of threads to compute a DPRT along prime directions for each logical core. The DPRTs computed by each logical core are summed and outputted.

With respect to computing an Inverse Discrete Periodic Radon Transform (iDPRT) using a multi-core CPU, a DPRT prime size parameter received and a set of prime directions partitioned into sets of threads with each thread comprising consecutive prime directions. A total sum of the inverse DPRT is computed and each partitioned set of threads is assigned to different logical cores of the multi-core CPU. Each logical core executes the assigned partitioned set of threads to compute an inverse DPRT for each logical core. The final image is reconstructed using each inverse DPRT computed by each logical core and the total sum of the inverse DPRT to output a final image.

Additionally, the invention provides a method for computing a forward Discrete Periodic Radon Transform (DPRT) using a GPU by receiving an input image and partitioning a set of prime directions into sets of threads with each thread comprising consecutive prime directions. Each set of threads is partitioned to different multiprocessors of the GPU, wherein each partitioned thread is a computation of a set of rays. Each multiprocessor executes in parallel the assigned partitioned set of threads to compute a DPRT along each ray for each multiprocessor, wherein rays that access the same row of pixels are synchronized. The DPRT computed by each multiprocessor is summed and output.

The invention also is directed to a method for computing an Inverse Discrete Periodic Radon Transform (iDPRT) using a GPU by receiving a DPRT size parameter and a DPRT. Prime directions are partitioned into sets of threads with each thread comprising consecutive prime directions. A total sum of the inverse DPRT is computed. Each partitioned set of threads is assigned to different multiprocessors of GPU, wherein each partitioned thread is a computation of a set of rays. Each multiprocessor executes in parallel the assigned partitioned set of threads to compute an inverse DPRT along each ray for each multiprocessor, wherein rays that access the same row of pixels are synchronized. A final image is reconstructed using each inverse DPRT computed by each microprocessor and the total sum of the inverse DPRT. The final image is then output.

The invention and its attributes and advantages may be further understood and appreciated with reference to the detailed description below of one contemplated embodiment, taken in conjunction with the accompanying drawings.

DESCRIPTION OF THE DRAWING

The accompanying drawings, which are incorporated in and constitute a part of this specification, illustrate an implementation of the invention and, together with the description, serve to explain the advantages and principles of the invention:

FIG. 2 illustrates the multi-core CPU algorithm for computing the DPRT according to the invention.

FIG. 3 illustrates the multi-core CPU algorithm for computing the inverse DPRT according to the invention.

FIG. 4 illustrates row-major memory accesses for synchronized, parallel thread execution for ray computations according to the invention.

FIG. 5 illustrates the algorithm for FastRayDPRT according to the invention.

FIG. 6 illustrates the algorithm for FastRayInvDPRT according to the invention.

FIG. 7 illustrates the algorithm for the kernel for each core on the GPU that supports thread-level parallelism according to the invention.

FIG. 8 illustrates the algorithm for the kernel for each core on the GPU that computes one ray of the inverse DPRT according to the invention.

FIG. 10 illustrates a chart of specific numbers for speedups and running times for several image sizes according to the invention.

FIG. 11 illustrates a chart of maximum image sizes that achieve real-time video implementations according to the invention.

DETAILED DESCRIPTION OF THE INVENTION

The invention is directed to fast and a scalable architectures and methods adaptable to available resources, that (1) computes DPRT on multicore CPUs by distributing the computation of the DPRT primary direction among the different cores, and (2) computes DPRT on GPUs using parallel, distributed, and synchronized ray computations among the GPU cores with "ray" referring to one of the sums required for computing the DPRT or its inverse along a prime direction.

The invention provides the following basic notation. Let f denote an image of N×N rows with N is a prime number. It is essential that N is prime to allow the computation of the forward and inverse DPRT using just N+1 prime directions as well as providing for a well-defined inverse DPRT. However, an arbitrarily sized image can be zero-padded to a prime number.

The DPRT of f is defined as:

$$R(m, d) = \begin{cases} \sum_{j=0}^{N-1} f(d, j), & m = N, \quad \text{Equation (1)} \\ \sum_{i=0}^{N-1} f(i, \langle d + mi \rangle_N), & 0 \leq m < N. \quad \text{Equation (2)} \end{cases}$$

where R is the radon space of the DPRT, m=0, 1, ..., N indexes a prime direction, d is the first pixel offset, and $\langle \bullet \rangle_N$ is a positive remainder when integer division by N is performed.

To compute the inverse DPRT, the total sum is computed as follows:

$$S = \sum_{j=0}^{N-1} \sum_{i=0}^{N-1} f(i, j) \quad \text{Equation (3)}$$

$$= \sum_{d=0}^{d=N-1} R(m, d) \text{ for any } m$$

$$= \sum_{d=0}^{d=N-1} R(0, d)$$

Using the above f is reconstructed from its DPRT using:

$$f(i, j) = \frac{1}{N}\left[\sum_{m=0}^{N-1} F(m, \langle j - mi \rangle_N) - S + R(N, i)\right] \quad \text{Equation (4)}$$

Figure 1:
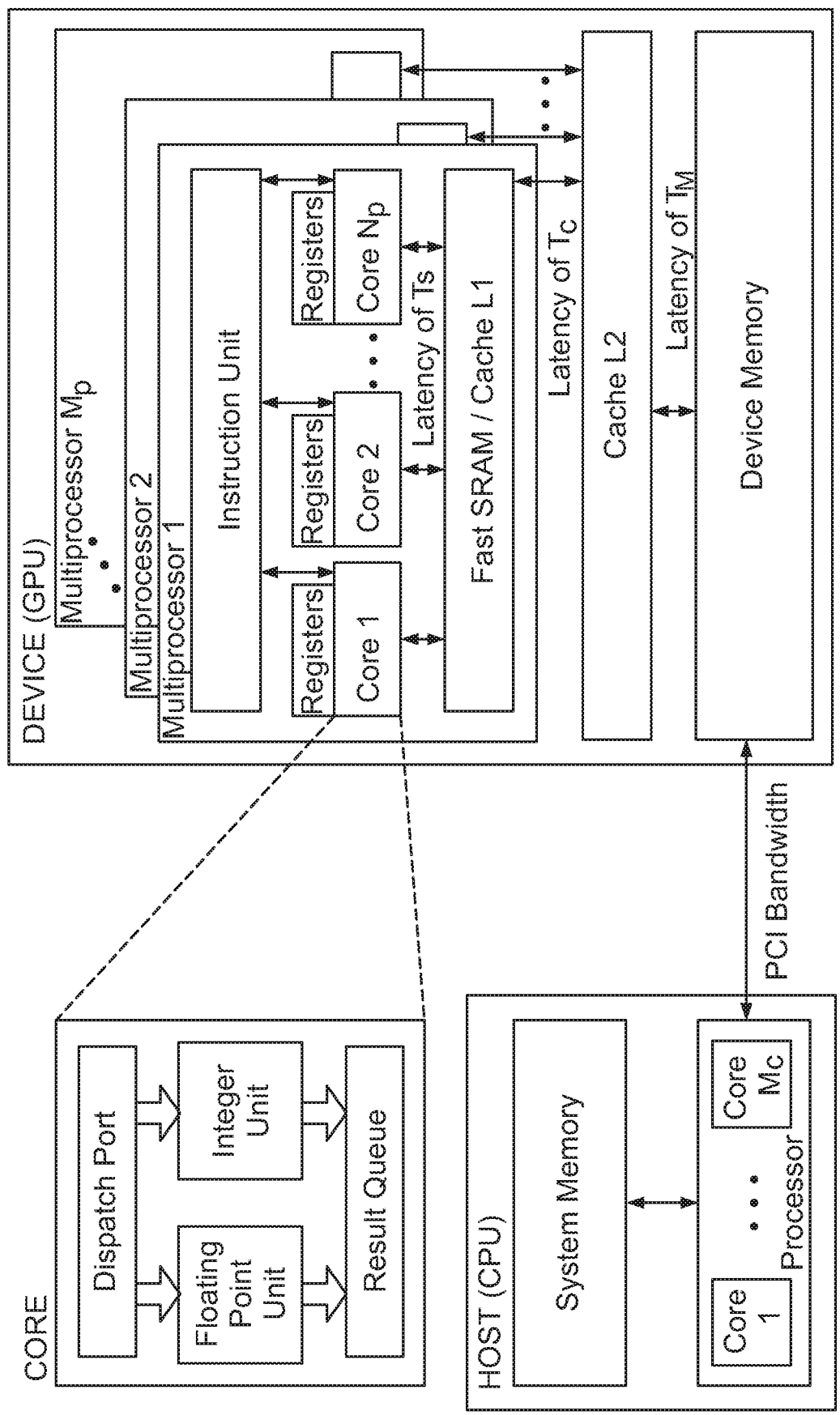
FIG. 1 illustrates a block diagram of an architecture for parallel processing using a CPU and a GPU according to the invention.

FIG. 1 illustrates a block diagram of an architecture for parallel processing using a CPU and a GPU according to the invention. Computations in the host system are performed by a multicore CPU. To draw a distinction between logical and hardware cores associated with the CPU, let $M_C$ refer to the number of actual hardware cores. An actual hardware core can be provided with special hardware support to execute multiple threads concurrently. The number of logical cores is given by $M_L$ and refers to the product of the actual number of hardware cores with the number of supported, possible threads per core. As an example, for an 8-core Intel CPU that can concurrently execute two threads per core provides $M_C$=8 hardware cores and a total of $M_L$=2$M_C$=16 logical cores.

Execution is performed on the $M_C$ hardware cores following a MIMD model. Due to the hardware support for parallel execution of multiple threads on each hardware core, from the programming perspective, parallel threads are programmed for the logical cores. Each core can perform fixed-point or floating-point operations in a single clock cycle and is supported by the memory hierarchy (L1, L2, and L3 cache). In terms of speed, relatively fast access to L1 and L2 is assumed, and substantially slower access to L3.

As shown in FIG. 1, a graphics processing unit (GPU) is connected to the CPU via the peripheral interconnect bus (PCI). The GPU consists of $M_P$ Multiprocessors (MP), that share a common Cache that is also connected to device memory. Inside each multiprocessor, $N_P$ processors (cores) are assumed, each with its own set of registers. Thus, there is a total of $M_P \cdot N_P$ cores. Within each multiprocessor, all of the cores share a local Fast SRAM. Each multiprocessor has an instruction unit that can dispatch the same instruction for parallel execution by all of the $N_P$ cores.

Programming the GPU requires special attention to the latencies associated with memory I/O. Within each core, register operations require a single clock cycle. Within each multiprocessor, access to the fast SRAM or cache L1 requires a few clock cycles (shown as $T_S$ in FIG. 1). Outside the multiprocessor, cache L2 memory access requires tens of clock cycles (shown as $T_C$ in FIG. 1). A cache miss requires access to the device memory that can cost hundreds of clock cycles (shown as $T_M$ in FIG. 1). Thus, for fast implementations, the goal is to load and operate on the data in the fast SRAM and/or the cache L1.

For programming the GPU, the Single Instruction Multiple Threads (SIMT) model is adopted. Within a multiprocessor, each core has access to a shared memory (fast SRAM). On the other hand, there is only one program memory from which a special control processor fetches and dispatches instructions. For each step, each core obtains from the control processor the same instruction and loads a separate data element through its private data access on which the instruction is performed. Thus, the instruction is synchronously applied in parallel by all cores to different data elements.

The computation of the DPRT and its inverse using primary directions on multi-core CPUs is now discussed. The number of cores in multi-core CPUs tends to be relatively small compared to the number of primary directions. As a result, the computation of several directions are assigned to each logical core. More specifically, for multi-core CPUs each thread is assigned with the computation of a set of prime directions of the DPRT or the inverse DPRT. For the DPRT, a single direction is associated with the computation of R(m, d) using Equation (1) or Equation (2) for DPRT of f provided above with a fixed value of m (all d). Similarly, for the inverse DPRT, a single direction is associated with the computation of f(i,f) using Equation (4) above for reconstructing f from its DPRT with a fixed value of i (all j).

Each thread is distributed to each logical core. For the DPRT, P=⌈(N+1)/$M_L$⌉ or P−1 directions are assigned per logical core with ext=P·$M_L$−N representing the extra directions that are not needed. Then, P−1 directions are assigned to $M_L$−1 logical cores and the remaining logical core gets assigned to execute the remaining directions. Similarly, for the inverse DPRT, the N directions are divided up using P=⌈N/$M_L$⌉.

The multi-core CPU algorithms for computing the DPRT and the inverse DPRT are shown in FIG. 2 and FIG. 3, respectively. More specifically, the algorithm for FastDirDPRT is given in FIG. 2. The threads are assigned as described above. For each thread, there is a call to DPRT_CPU_Core ( ) to compute Equations (1)-(2) for each direction that belongs in the corresponding thread set Dirns$_i$. Similarly, FastInvDirDPRT calls iDPRT_DPRT_Core ( ) to compute Equation (4) for each direction in its corresponding thread set Dirns$_i$. (see FIG. 3).

In terms of computational complexity, it needs to be determined how long it takes for the slowest thread to complete. The nested loops given in lines 6-12 of FIG. For FastDirDPRT, nested loops are given in lines 6-12. 15-23 of FIG. 2. Since the largest number of directions in Dirns$_i$ is P, the computational complexity is 0(P·N$^2$). Similarly, for FastInvDirDPRT, nested for-loops in lines 6-14 of FIG. 3 give a computational complexity of 0(P·N$^2$).

Turning to the GPU, parallel algorithms are provided for computing the forward and inverse DPRT. Unlike multi-core CPUs, GPUs offer a large number of cores. In fact, the number of GPU cores ($M_P \cdot N_P$) is often in the order of N, the number of columns (or rows) in the image. As discussed above, for fast memory I/O, the goal is to process the image data using Fast SRAM/Cache L1 associated with each multiprocessor (see FIG. 1). Unfortunately, Fast SRAM/Cache L1 memory may be limited leaving the big challenge in developing effective algorithms for GPUs that increase the level of parallelism while maintaining low requirements on the required amount of memory.

To increase the level of parallelism, each thread is assigned with the computation of a single ray of the DPRT or the inverse DPRT. Ray computation is defined as the computation of R(m, d) using Equation (1) and Equation (2) for fixed values of m and d. Similarly, for the inverse DPRT, ray computation is defined as the computation of f(i,j) using Equation (4) for fixed values of i and j. Furthermore, as for the case for multi-core CPUs, each multiprocessor is associated with the computation of a set of prime directions.

Next, we discuss some basic concepts with respect to parallel ray computations on many cores. A simple example of N=7 is used to introduce the most important concepts. For computing the DPRT, 8 prime directions are given by m=0, 1, 2, . . . , 7. The simplest case comes from m=0:

$$R(0,d) = \sum_{j=0}^{6} f(d,j), d=0,1,\ldots,7 \quad \text{Equation (5)}$$

Now, to compute R(0, d) by launching a parallel thread for each value of d (each ray). Similarly, for more complex directions, we still have that the threads are accessing a single row. To see this, consider the computation of R(1, d) using 7 parallel threads to compute the 7 rays given by:

$$m = 1, th0: R(1, 0) = \sum_{i=0}^{6} f(i, <0+i>_7)$$

$$m = 1, th1: R(1, 1) = \sum_{i=0}^{6} f(i, <1+i>_7)$$

...

$$m = 1, th6: R(1, 6) = \sum_{i=0}^{6} f(i, <6+i>_7)$$

Here, note that each thread accesses a different column, but all of them access the same row when computing the i-th element of their corresponding ray. Thus, if f is stored in row-major format (as concatenated rows), each thread would access memory using a constant stride and if the threads are synchronized (all threads process the same i-th element of their corresponding ray) all threads access the same row memory as can be seen in FIG. 4B.

Figure 4:
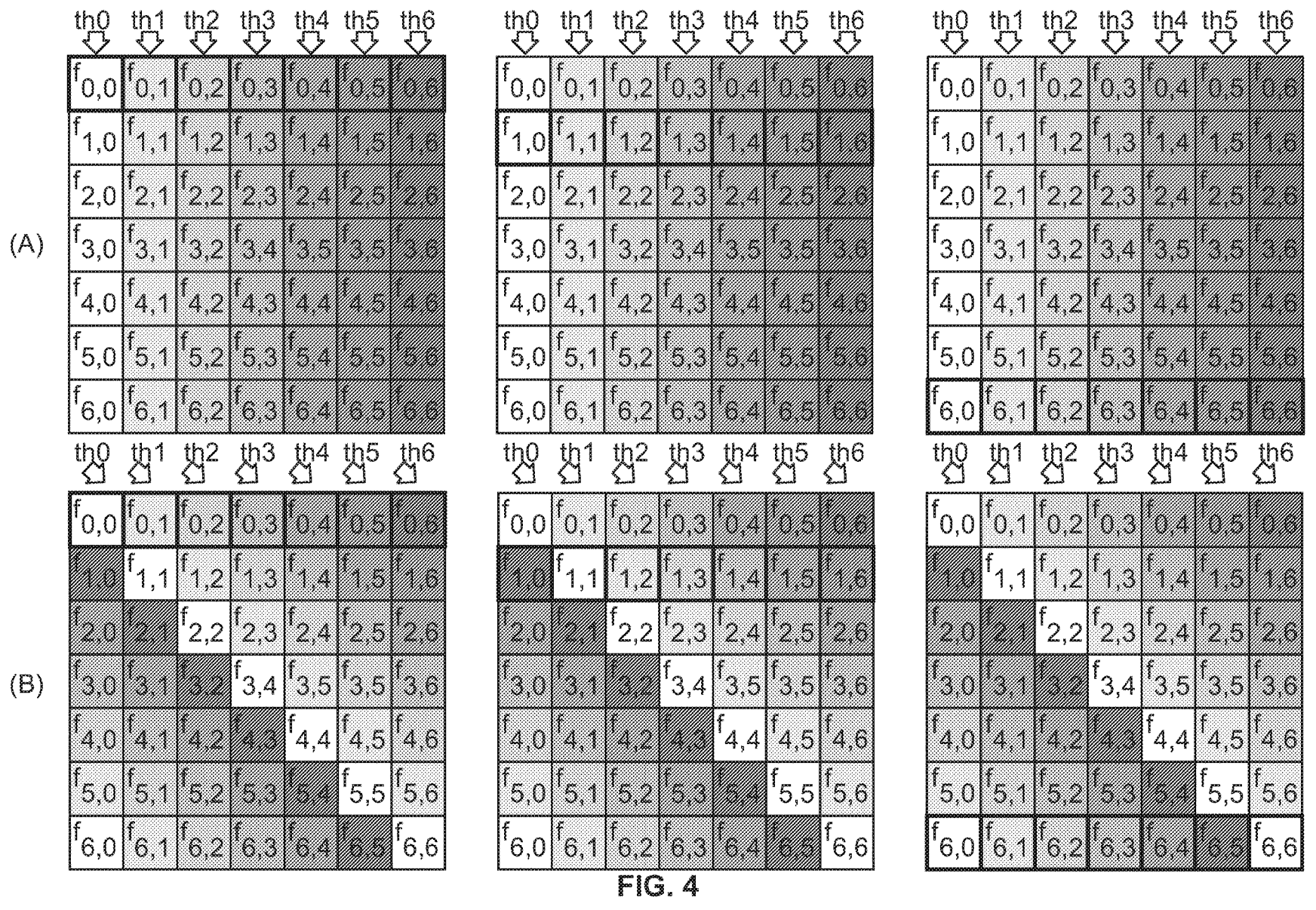

FIG. 4 illustrates row-major memory accesses for synchronized, parallel thread execution for ray computations according to the invention. The input image is assumed to be of size 7×7. For each step, a bold square highlights the pixel being accessed. For each thread, distinct grayscale shade is used to identify the pixels that need to be accessed. Row by row access for m=0 by 7 parallel threads is shown in FIG. 4A. Initially, all threads are accessing the top row (left image). The middle image shows memory access for i=1. The right image shows memory access for the last row. FIG. 4B shows row by row access for m=1 by 7 parallel threads. After accessing the top row (left image), execution proceeds to the second row (middle image). The last row is accessed for the final computations.

Assuming f is stored in row-major format in img, as shown in FIG. 4B, the parallel thread begins with accessing:

$$th0: img[0][0], th1: img[0][1], \ldots, th6: img[0][6], \quad \text{Equation (6)}$$

which represents the first row of pixels. Then, for i=1, the following is required:

$$th0: img[1][1], \ldots, th5: img[1][6], th6: img[1][0], \quad \text{Equation (7)}$$

where the last thread represents a wrap-around. It is important to note that the wrap-around forces the threads to stay on the same row when computing the i-th element. There is a potential for a cache-miss when accessing the data, especially for large images.

First, since all the threads are accessing the same row and the data is in the same neighborhood, one cache miss will force the fetching of that data for all of the parallel threads. Second, if a cache-miss does occur, thread execution stalls. In such a case, the scheduler initiates execution of the next set of threads while the data of the previous set is being accessed. In row-major format, there is regularity in such memory accesses.

More generally, for any direction m satisfying 0≤m<N, for each i, img[i][<0+mi>$_N$] is required which accesses all of the elements in the row since N is prime. In fact, for any two consecutive directions, img[i][<0+mi>$_N$] is simply a circularly-shifted version img[i][<0+(m+1)i>$_N$] (compare Equation (6) and Equation (7)).

Thus, row-by-row access is followed within any single direction, for 0≤m<N. As long as the image is stored row-by-row in the Fast SRAM/Cache L1 there will not be a cache-miss. Since the entire row is needed, even if a cache-miss occurs, the result will be the fetching of a row-block that supports the needs of future threads in the same direction. For much smaller images, there will be no issue because the computation of the first direction will result in bringing the entire image in the Fast SRAM/Cache L1, and the rest of the directions will simply find it there.

The main components of the FastRayDPRT and FastRayInvDPRT include top level partition of the prime directions, launching of parallel threads for each MP and synchronize the threads.

FIG. 5 illustrates the algorithm for FastRayDPRT and FIG. 6 illustrates the algorithm for FastRayInvDPRT. The top level partition of the prime direction is shown at line 1 of FIG. 5 and line 1 in FIG. 6: N+1 directions are subdivided among the $M_P$ MPs (with $M_L=M_P$). This approach balances the processing load among the MPs.

As shown by line 2 in FIG. 5 and line 3 in FIG. 6, each MP launches in parallel the full amount of threads to process the whole set of assigned directions. Thus, if the number of directions assigned to the i-th MP is $P_i$, then the total number of threads launched is N·$P_i$. Then, the number of threads assigned to each MP is maximized, allowing room for the scheduler to switch between threads when a stall occurs.

For synchronized threads, for 0≤m<N, the synchronized rays access the same row of pixels (e.g., see FIG. 4). For the FastRayDPRT described in FIG. 5, execution of the if-statement can break synchronicity. After the if-statement, synchronization is restored by including a special statement in line 13 as shown in FIG. 7. More specifically, FIG. 7 illustrates the algorithm for the kernel for each core on the GPU that supports thread-level parallelism according to the invention.

On the other hand, synchronized execution for FastRayInvDPRT does not require any special treatment (see FIG. 8). This rule along with the row-major format for storage minimizes dramatically the number of stalls in the processing, i.e., access to FastSRAM or Cache L1 dominates the parallel processing. More specifically, FIG. 8 illustrates the algorithm for the kernel for each core on the GPU that computes one ray of the inverse DPRT according to the invention.

Then, for each prime direction, within each multiprocessor, $N_P$ rays are processed in parallel until the completion of computations for all of the N rays. Then, the next prime direction is processed and so on until all of the prime directions are computed associated with $Thr_p$ for the p-th multiprocessor. After a core computes one ray, the result is directly stored in the device memory (see FIG. 1). There is no need to hold the results in the fast SRAM because there is no further use of that result and there is no chance of concurrent writes. During the process, the image f[i][j] is assumed to be on the device memory and the result is stored in the same memory.

The computation of the inverse DPRT is slightly different. First, the inverse DPRT only requires N prime directions (the horizontal one is not needed). Second, the final output per ray needs two additional additions and one division (line 11 in FIG. 8).

With the input image represented using B bits per pixel, exact additions require $B+\lceil \log_2 N \rceil$ for the DPRT outputs (for computing R[m][d]) due to the additions associated with each ray. Similarly, prior to the division (see line 11 in FIG. 6), R[m][d] requires $b+\lceil \log_2 N \rceil$ bits. Clearly, after the division, the reconstructed image only needs B bits for perfect reconstruction (as for the input). Thus, for 8-bit input images, 32-bit arithmetic (fixed point) will produce perfect reconstruction for images up to $N<2^{12}=4096$.

Now discussed are the performance bounds for FastRayDPRT and FastRayInvDPRT, specifically the requirements on the number of processors for achieving different levels of performance. Noting that the DPRT computation requires the computation of sums along (N+1)·N rays, the number of rays is reduced to $N^2$ for the inverse DPRT. Discussing the requirements for the DPRT, the extension of the results to the inverse DPRT is straight-forward.

Let p be the number of processors. For GPU implementations, $p=M_p \cdot N_p$ where $M_p$ denotes the number of multiprocessors and $N_p$ denotes the number of cores per multiprocessor. Each processor is assigned to compute $\lceil (N+1)N/p \rceil$ rays and possibly 1 less for some cores. Based on the basic model of computing a single ray per thread presented above, the following can be achieved: (1) linear execution time O(N), (2) quadratic execution time $O(N^2)$, and (3) cubic execution time $O(N^3)$.

To support a wide range of comparisons, the algorithms were implemented for 170 prime sizes that ranged from 5×5 to 1021×1021. For the GPU implementation, results are provided for video images of 1471×1471, which represents the largest image size for which real-time video can be processed at 30 frames per second. In each case, the input image is built using random, 8-bit integers. As a result, exact arithmetic was possible which allowed the inverse DPRT to perfectly reconstruct f from R (its DPRT) using 32-bit fixed point arithmetic.

The implementation of FastDirDPRT and FastDirInvDPRT on the CPU (for example Xeon E5-2630) used 16 parallel threads that correspond to 8 physical cores with special support for running 2 threads in parallel. Each physical core has its own dedicated L1 and L2 caches. Collectively, all physical cores shared the L3 cache and an off-chip system memory. For parallel processing, both algorithms are implemented using POSIX threads (also called Pthreads) that were programmed in C. The image (or DPRT) is loaded in system memory and thus made available to each thread. The implementation used concurrent reads and no concurrent writes.

FastRayDPRT and FastRayInvDPRT on the GPU (for example, Maxwell architecture (GM204) provide efficient implementations despite the limited amount of fast memory. Current GPUs provide limited amounts of fast SRAM. However, for the ray-based algorithms (FastRayDPRT and FastRayInvDPRT), only requires storing the current row in the FastRam or the L1 cache. Thus, the FastRam of 48K allows running much larger images (N=12K), or N=6K using the L1 cache. On the other hand, as discussed above, for exact DPRT computations, the maximum image size is restricted to 4093×4093. Furthermore, real-time performance of 30 frames per second can be maintained for images of size 1471×1471.

The implementations also benefited from efficient memory I/O. First, sequential memory accesses are supported by memory transfers of 128 bytes that brought into the cache 32 pixels (4 bytes each) that could be used by the 32 threads in the current or later warps. Second, within each multiprocessor, 32 cores could perform block writes using row-major ordering with no conflicts (no concurrent writes). Third, the L1 cache provided is used by the GPU by compiling the code. These compile-time options force all reads to be cached provided that the input is in read-only mode, as is the case for the input image (or DPRT for inverse DPRT computation). Additionally, using cache L1 leverages the additional coding needed to use the Fast SRAM and provides the same performance.

The implementations were also optimized for warps. First, the prime directions were partitioned into the 16 multiprocessor sets by the scheduler by using proper thread enumeration, sequential launching, and distribution of the threads (in blocks) to execution capacity. Then, each multiprocessor further partitioned the blocks into warps. Each warp supported the parallel execution of 32 threads. Within each warp, there were no bank conflicts between the threads because FastRayDPRT and FastRayInvDPRT required different addresses as described above. When a warp stalled (e.g., requiring device memory access), the warp scheduler switched to another warp that was ready to execute. Thus, delays due to memory stalls are minimized. Furthermore, by launching all threads at the beginning, additional delays are avoided due to the large number of warps that are ready for execution. As a result, each multiprocessor is always occupied with the execution of the maximum (up to 32) number of blocks. Furthermore, the modulo operations were executed in parallel during a memory accesses so as to minimize their impact on the main kernel loop.

For the following discussion, it should be noted that p=2048 (total number of cores), $f_{GPU}$=1367 MHz, and $f_{CPU}$=3.2 GHz, with 8 hardware cores and 16 logical cores in the CPU. Additionally, the proposed algorithms are compared against FPGA implementations that process H=2 rows in parallel at a clock frequency of $f_{CLK}$=100 MHz.

Turning first to the analysis of the performance achieved by the FastDirDPRT, specific numbers for speedups and running times for several image sizes in FIG. 10. As can be seen from FIG. 10, the maximum speedup is 12.83 for FastDirDPRT and 12.53 for fastDirInvDPRT for images of sizes 701×701.

Figure 9:
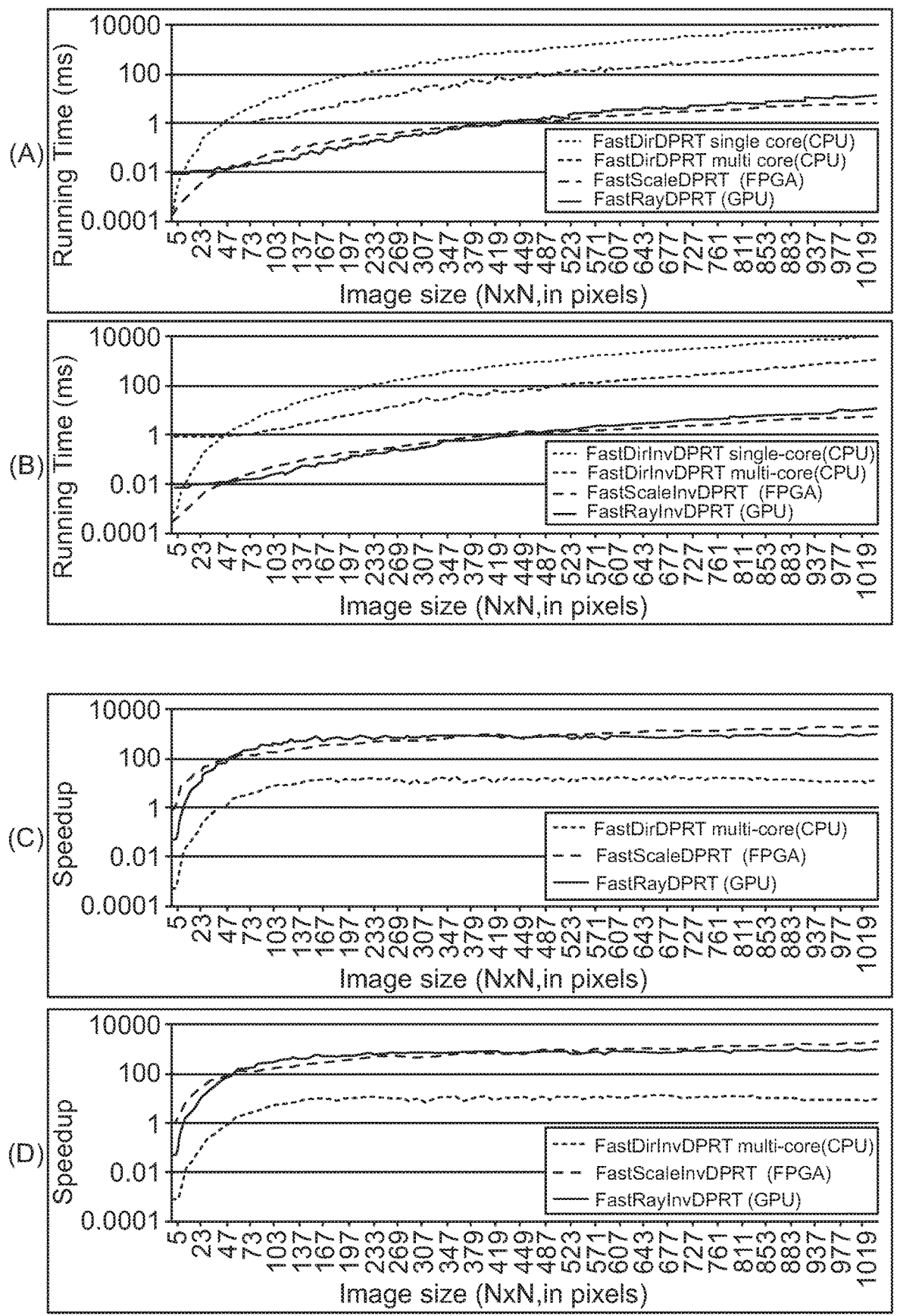
FIG. 9 illustrates a chart of performance and resource comparisons according to the invention.

FIG. 9 illustrates a chart of performance and resource comparisons between FastDirDPRT, FastDirInvDPRT, FastRayDPRT, FastRayInvDPRT, FastScaleDPRT and FastScaleInvDPRT. In particular, the algorithms were implemented for 170 prime number cases that ranged from 5×5 to 1021×1021. In each case, the input image was built using random, 8-bit integers with exact computations using 32-bit fixed-point arithmetic. More specifically, FIG. 9A illustrates comparative running times for the DPRT, FIG. 9B illustrates comparative running times for the inverse DPRT, FIG. 9C illustrates speedup comparisons for the DPRT and FIG. 9D illustrates speedup comparisons for the inverse DPRT.

From FIG. 9C it can be shown that the multi-core FastDirDPRT begins to improve over the single-core FastDirDPRT for N>47. For N=47 to N=137, there is a roughly constant speedup increase to 10. There is a constant speedup around 10 for all measurements, until the maximum value of N=1021. Since 10>8, the speedup of the multi-core FastDirDPRT implementation exceeds the number of hardware cores. This speedup is achieved due to the hyper-threading used in the multi-core implementation. Overall, a 10× speedup (up to 12.83×) demonstrates that the FastDirDPRT approximates very well what is possible with the number of cores (8 hardware and 16 logical cores).

FIG. 10 and FIG. 9 provide the results of the performance analysis and trends for the GPU implementation of FastRayDPRT and FastRayInvDPRT. As described above, for very small N(N<47), p=2048>44·43=1892 (43 is the next prime less than 47), which implies that there are more GPU cores than rays to compute. As a result, as a function of N, the execution time is linear and the effective speedup is bounded above by $(f_{GPU}/f_{CPU}) \cdot N \cdot (N+1) = 0.42 \cdot N \cdot (N+1)$ for the DPRT and $0.42N^2$ for the inverse DPRT. For N≥47, all of the GPU cores are assigned at-least one or more rays to compute. Then, the ideal upper bound on the speed-up becomes $(f_{GPU}/f_{CPU}) \cdot p$ which gives 860. For N>167, speedup is around 600~870 that indicates that FastRayDPRT scales very well. Here, it is noted that for N>79, the local cache of 24K cannot hold the entire image in fast SRAM. Thus, for N>79, there is a need to access slower memory. Access to slower memory is handled very efficiently as described above. From FIG. 9, the GPU implementations achieved the maximum speedups (853 for FastRayDPRT and 873 for FastRayInvDPRT) for the largest image size of 1021×1021. Overall, both the FastRayDPRT and FastRayInvDPRT implementations approximate ideal speedups for a wide range of image sizes.

The performance of the GPU implementations also approximates highly-efficient FPGA implementations using H·N=2N parallel cores. It is noted that certain FPGA implementations avoid all I/O issues by moving entire rows or columns in a single clock cycle. Furthermore, all FPGA computations are also completed in a single clock cycle (at a much lower clock frequency). As provided by the results, fast GPU implementations of the FastRayDPRT and FastRayInvDRPT can be achieved without requiring custom-built hardware architectures.

With respect to real-time video processing applications, maximum image sizes for which the DPRT can be computed at 30 frames per second as shown in FIG. 11. Smaller image sizes to allow for additional processing time are also considered. As an example, real-time video processing of 1021× 1021 videos at 30 fps using the FastRayDPRT and the FastRayInvDPRT requires a total of 22 ms per frame and allows 11 ms per frame for additional computations.

The invention provides new, parallel algorithms for computing the DPRT and its inverse on multi-core CPUs and GPUs. As provided above, the invention can differentiate between multi-core CPUs with a limited number of cores and access to reasonable memory resources as opposed to GPUs that exhibit a much larger number of cores with access to limited memory. For multi-core CPUs, FastDirDPRT and FastDirInvDPRT distribute the computation of the prime directions of the DPRT and its inverse using parallel threads over the logical cores. For GPUs, FastRayDPRT and FastRayInvDPRT minimize memory requirements to a single row of pixels and efficiently handle memory to compute the DPRT and its inverse using a large number of parallel threads that are distributed over the many cores.

The described embodiments are to be considered in all respects only as illustrative and not restrictive, and the scope of the invention is not limited to the foregoing description. Those of skill in the art may recognize changes, substitutions, adaptations and other modifications that may nonetheless come within the scope of the invention and range of the invention.

The invention claimed is:

1. A method for computing a Discrete Periodic Radon Transform (DPRT) on a Graphics Processing Unit (GPU) comprising the steps of:
   distributing a computation of prime directions among multiprocessors (MPs), wherein the distributed prime directions are each partitioned into threads;
   synchronizing parallel threads so that each thread always reads from a same row of pixels at the same time;
   enforcing row-major ordering for read and write operations for each thread; and
   applying one or more optimizations to each thread, wherein the one or more optimizations comprise a pixel width, an optimal concurrency of warps, a fast address calculation and a modulo operation masking.

2. The method according to claim 1, wherein the computation for the Discrete Periodic Radon Transform (DPRT) using the GPU comprises the steps of:
   receiving an input image f of a size N×N, wherein N is a prime number;
   partitioning a set of N+1 prime directions into sets of threads with each thread comprising consecutive prime directions;
   assigning each partitioned set of threads to different multiprocessors of the GPU, wherein each partitioned thread is a computation of a set of rays;
   executing in parallel by each multiprocessor the assigned partitioned set of threads to compute a DPRT along each ray for each multiprocessor, wherein rays that access the same row of pixels are synchronized;
   summing the DPRT computed by each multiprocessor; and
   outputting the summed DPRT.

3. The method according to claim 2, wherein a single ray of the DPRT is computed using:

$$R(m, d) = \begin{cases} \sum_{j=0}^{N-1} f(d, j), & m = N, \\ \sum_{i=0}^{N-1} f(i, \langle d + mi \rangle_N), & 0 \leq m < N. \end{cases}$$

where R is the radon space of the DPRT, m=0, 1, N indexes a prime direction, d is the first pixel offset, and $\langle \cdot \rangle_N$ is a positive remainder when integer division by N is performed, $S = \sum_{j=0}^{N-1} \sum_{j=0}^{N-1} f(i,j)$, and the pair (m, d) indexes the computation of a single ray as a sum of pixels for a particular direction and offset.

4. The method according to claim 2 extended for the computation of the Inverse Discrete Periodic Radon Transform (iDPRT).

5. The method according to claim 4, wherein the computation for the Inverse Discrete Periodic Radon Transform (iDPRT) using the GPU comprises the steps of:
receiving a DPRT size parameter N and a DPRT of size (N+1)×N;
partitioning a set of N prime directions into sets of threads with each thread comprising consecutive prime directions;
computing a total sum of the inverse DPRT;
assigning each partitioned set of threads to different multiprocessors of GPU, wherein each partitioned thread is a computation of a set of rays;
executing in parallel by each multiprocessor the assigned partitioned set of threads to compute an inverse DPRT along each ray for each multiprocessor, wherein rays that access the same row of pixels are synchronized;
reconstructing a final image using each inverse DPRT computed by each microprocessor and the total sum of the inverse DPRT; and
outputting the final image.

6. The method according to claim 5, wherein a ray of the Inverse Discrete Periodic Radon Transform (iDPRT) is:

$$f(i, j) = \frac{1}{N}\left[\sum_{m=0}^{N-1} R(m, \langle j - mi \rangle_N) - S + R(N, i)\right]$$

where f(i,j) is the inverse input image, R is the radon space of the DPRT, m=0,1, . . . ,N indexes a prime direction, $\langle \bullet \rangle_N$ is a positive remainder when integer division by N is performed, $S=\Sigma^{N-1}_{j=0}\Sigma^{N-1}_{j=0}f(i,j)$, and (i,j) denotes the index of a single ray of computations.

7. The method according to claim 4 wherein the computation of Discrete Periodic Radon Transform (DPRT) and the computation of Inverse Discrete Periodic Radon Transform (iDPRT) are implemented in parallel.

8. A method for computing a Discrete Periodic Radon Transform (DPRT) on a Graphics Processing Unit (GPU) comprising the steps of:
distributing a computation of prime directions among multiprocessors (MPs), wherein the prime directions are partitioned into threads;
receiving an input image f of a size N×N, wherein N is a prime number;
partitioning a set of N+1 prime directions into sets of threads with each thread comprising consecutive prime directions;
assigning each partitioned set of threads to different multiprocessors of the GPU, wherein each partitioned thread is a computation of a set of rays;
executing in parallel by each multiprocessor the assigned partitioned set of threads to compute a DPRT along each ray for each multiprocessor, wherein rays that access a same row of pixels are synchronized;
summing the DPRT computed by each multiprocessor; and
outputting the summed DPRT.

9. The method according to claim 8 further comprising the steps of:
synchronizing parallel threads so that each thread always reads from the same row of pixels at the same time;
enforcing row-major ordering for read and write operations; and
applying one or more optimizations comprising pixel width, optimal concurrency of warps, fast address calculation and modulo operation masking.

10. The method according to claim 8, wherein a single ray of the DPRT is computed using:

$$R(m, d) = \begin{cases} \sum_{j=0}^{N-1} f(d, j), & m = N, \\ \sum_{i=0}^{N-1} f(i, \langle d + mi \rangle_N), & 0 \le m < N. \end{cases}$$

where R is the radon space of the DPRT, m=0, 1, . . . , N indexes a prime direction, d is the first pixel offset, and $\langle \bullet \rangle_N$ is a positive remainder when integer division by N is performed, $S=\Sigma^{N-1}_{j=0}\Sigma^{N-1}_{j=0}f(i,j)$, and the pair (m, d) indexes the computation of a single ray as a sum of pixels for a particular direction and offset.

11. The method according to claim 8 extended for the computation of the Inverse Discrete Periodic Radon Transform (iDPRT).

12. The method according to claim 11 wherein the computation of Discrete Periodic Radon Transform (DPRT) and the computation of Inverse Discrete Periodic Radon Transform (iDPRT) are implemented in parallel.

13. The method according to claim 11, wherein the computation for the Inverse Discrete Periodic Radon Transform (iDPRT) using the GPU comprises the steps of:
receiving a DPRT size parameter N and a DPRT of size (N+1)×N;
partitioning a set of N prime directions into sets of threads with each thread comprising consecutive prime directions;
computing a total sum of the inverse DPRT;
assigning each partitioned set of threads to different multiprocessors of GPU, wherein each partitioned thread is a computation of a set of rays;
executing in parallel by each multiprocessor the assigned partitioned set of threads to compute an inverse DPRT along each ray for each multiprocessor, wherein rays that access the same row of pixels are synchronized;
reconstructing a final image using each inverse DPRT computed by each microprocessor and the total sum of the inverse DPRT; and
outputting the final image.

14. The method according to claim 11, wherein a ray of the Inverse Discrete Periodic Radon Transform (iDPRT) is:

$$f(i, j) = \frac{1}{N}\left[\sum_{m=0}^{N-1} R(m, \langle j - mi \rangle_N) - S + R(N, i)\right]$$

where f(i, j) is the inverse input image, R is the radon space of the DPRT, m=0, 1, . . . , N indexes a prime direction, $\langle \bullet \rangle_N$ is a positive remainder when integer division by N is performed, $S=\Sigma^{N-1}_{j=0}\Sigma^{N-1}_{j=0}f(i, j)$, and $(_o)$ denotes the index of a single ray of computations.

* * * * *